United States Patent
Battlogg et al.

(10) Patent No.: US 9,841,078 B2
(45) Date of Patent: Dec. 12, 2017

(54) METHOD AND LOADING UNIT FOR DAMPING LOADS WHICH ACT IN THE CASE OF OVERLOAD

(71) Applicant: GENERAL DYNAMICS EUROPEAN LAND SYSTEMS-MOWAG GMBH, Kreuzlingen (CH)

(72) Inventors: Stefan Battlogg, St. Anton I.M. (AT); Markus Mayer, Sulz (AT)

(73) Assignee: General Dynamics European Land Systems-Mowag GmbH, Kreuzlingen (CH)

( * ) Notice: Subject to any disclaimer, the term of this patent is extended or adjusted under 35 U.S.C. 154(b) by 0 days.

(21) Appl. No.: 15/125,646

(22) PCT Filed: Mar. 13, 2015

(86) PCT No.: PCT/EP2015/055375
§ 371 (c)(1),
(2) Date: Sep. 13, 2016

(87) PCT Pub. No.: WO2015/136111
PCT Pub. Date: Sep. 17, 2015

(65) Prior Publication Data
US 2017/0002890 A1 Jan. 5, 2017

(30) Foreign Application Priority Data
Mar. 13, 2014 (DE) ......................... 10 2014 103 463

(51) Int. Cl.
*F16F 15/03* (2006.01)
*F16F 9/53* (2006.01)
(Continued)

(52) U.S. Cl.
CPC ................ *F16F 9/535* (2013.01); *B60N 2/24* (2013.01); *B60N 2/4242* (2013.01);
(Continued)

(58) Field of Classification Search
CPC ..... B60N 2/0276; B60N 2/4242; F16F 9/535; F16F 7/127; F16F 9/19; F16F 13/007
(Continued)

(56) References Cited

U.S. PATENT DOCUMENTS 4,958,704 A * 9/1990 Leiber ....................... F16F 9/46
188/267
9,126,625 B2 * 9/2015 Battlogg .............. B60N 2/0276
(Continued)

FOREIGN PATENT DOCUMENTS

DE       102010020086 A1   11/2011
WO       2011141164 A1     11/2011

*Primary Examiner* — Todd M Epps
(74) *Attorney, Agent, or Firm* — Laurence A. Greenberg; Werner H. Stemer; Ralph E. Locher

(57) ABSTRACT

An energy absorber is controlled in an overload event to absorb potentially damaging energy. The energy absorber acts between a receiving unit for receiving objects for transporting and a carrier device that connects to a transporter. An absorber force can be influenced by an electrically controlled magnetic field unit. Measurement values of loads acting on the loading unit are captured sequentially and an overload event is determined if a measure derived from the measurement values exceeds a predetermined threshold value. After the onset of an overload event a prognosticated load curve of the loading unit is assessed from a multitude of measurement values captured from the onset of the overload event. A planned power flow curve for the magnetic field unit is determined and the load curve is damped time-dependent so that a planned load curve ensues which remains beneath a predetermined load limit.

19 Claims, 4 Drawing Sheets

(51) Int. Cl.
  *B60N 2/24*    (2006.01)
  *B60N 2/42*    (2006.01)
  *B60N 2/427*   (2006.01)
  *F16F 15/00*   (2006.01)
  *F16F 7/12*    (2006.01)
  *B60N 2/50*    (2006.01)
  *F16F 13/00*   (2006.01)

(52) U.S. Cl.
  CPC .......... *B60N 2/42709* (2013.01); *F16F 7/127* (2013.01); *F16F 15/002* (2013.01); *B60N 2/50* (2013.01); *F16F 13/007* (2013.01)

(58) Field of Classification Search
  USPC ................... 248/636; 188/267, 267.1, 267.2
  See application file for complete search history.

(56) References Cited

U.S. PATENT DOCUMENTS

| | | |
|---|---|---|
| 2008/0015753 A1 | 1/2008 | Wereley et al. |
| 2008/0156602 A1* | 7/2008 | Hiemenz .............. B60N 2/4242 188/267.1 |
| 2010/0230989 A1 | 9/2010 | Cantor et al. |
| 2011/0035118 A1 | 2/2011 | Hiemenz et al. |
| 2013/0025987 A1* | 1/2013 | Batterbee ................. F16F 9/53 188/267.2 |
| 2013/0060428 A1 | 3/2013 | Battlogg et al. |

* cited by examiner

METHOD AND LOADING UNIT FOR DAMPING LOADS WHICH ACT IN THE CASE OF OVERLOAD

BACKGROUND OF THE INVENTION

Field of the Invention

The present invention relates to a method for energy absorption respectively dissipation of energy for damping loads acting in a single overload event in particular on a loading unit for transporting objects, to protect the objects transported such as persons or items from damage. Such a single overload event involving energy input occurs with the explosion of a mine.

A variety of methods have been disclosed for energy absorption to reduce loads in overload cases, such as and in particular in the case of explosions beneath armoured vehicles to protect the transported objects and in particular persons and delicate instruments. For protection, mechanical systems are typically employed which absorb energy by reshaping or tearing open so as to absorb energy in an overload event and protect the passengers accordingly.

The drawback is that these systems do not allow controlling the energy absorption in an overload event with unknown pulse strength and unknown pulse curves. The pulse strength and pulse length of mine explosions are unpredictable prior to an explosion since the type and strength of the mine, the location, the precise position, depth in the ground, and the material surrounding the mine is not previously known in a real overload event. Monitoring and evaluating the vehicle speed or other parameters preceding the onset of the overload event, i.e. the explosion of a mine, do not allow to estimate the strength of an explosion. Therefore an overload event in the sense of the present invention does not allow exact planning of the energy absorption curve before the onset of the overload event.

WO 2011/141164 A1 has disclosed a regulating method for an energy absorber of a steering column where a sensor obtains the relative speeds of the energy absorber components which are movable relative to one another. Thereafter the energy absorber is controlled so that the deceleration assumes the most constant and lowest value possible so that at the end of the travel of the movable energy absorber parts their relative speed approximates 0. Furthermore this document also points out the conceivable use of such an energy absorber with safety belt devices, mine protection seats, in bumpers, machine tools, arresting gear for landing aircraft on aircraft carriers, damping systems for helicopters, and damping systems in footwear. This method of controlling the energy absorber so that at the end of travel of the energy absorber components movable relative to one another the relative motion is decelerated to 0, can be carried out only if the boundary parameters are known. If a vehicle traveling on a road drives into the back of a car in front, then the relative speed is directly known and the entire stroke length can be optimally utilized for controlled decelerating of the relative motion. The same applies to the arresting gear for landing aircraft on aircraft carriers and even to a helicopter crash where the height and velocity of fall are previously known.

In all applications the maximum travel is employed to its optimum to achieve the lowest possible load e.g. in a car crash so that the driver is subjected to the lowest possible loads upon impact on the steering column. This system is functional with regulating the energy absorber on steering columns or in other applications where the velocities and thus the loads occurring are known and the available travel can be correlated with the given relative speed.

Given an application e.g. in mine protection seats involving an unknown strength of an explosion in an overload event such as a mine exploding beneath an armoured vehicle, such regulating achieves the desired results in the case of a suitable explosion. The forces occurring can be transmitted dampened to the body of a person sitting on the mine protection seat. The loads can be considerably reduced. The deceleration respectively the relative velocity is set so that a constantly low load is given over the travelled distance.

This method requires known initial conditions and boundary conditions. External influences whose strength and duration are first unknown may lead to unexpected results so that damping may be too low or too high.

BRIEF SUMMARY OF THE INVENTION

It is therefore the object of the present invention to provide a method and an assembly for damping which allow better control of overload events which occur while all the data required for optimal control are not available at the onset of the overload event.

This object is solved by a method having the features as claimed and by an assembly having the features as claimed. Preferred specific embodiments of the invention are defined in the dependent claims. Further advantages and features can be taken from the general description and the description of the exemplary embodiments.

A method according to the invention serves to control an energy absorber on a loading unit at least in an overload event to reduce loads acting on an object that is transported on a loading unit. The energy absorber acts between a receiving unit for receiving objects for transporting and a carrier device for connection with a transporter such as a vehicle or the like. An absorber force of the energy absorber can be influenced by means of an electrically controlled magnetic field unit.

The energy absorber is in particular suitable to absorb energy in a single overload event involving energy input that is so high that absent an energy absorber, damage to an object transported on the loading unit is highly probable, so as to reduce loads acting on the transported object in the overload event by way of energy absorption by means of the energy absorber.

The method according to the invention provides for the steps indicated below in particular in this or else in any other expedient sequence:

- Measurement values of loads acting on the loading unit are captured sequentially in particular by means of a sensor device. The measurement values may directly show loads on the loading unit. Or else the measurement values may be captured at the transporter or an object and thus they are characteristic of loads on the loading unit or an object.
- An overload event is determined or detected if a measure derived from the measurement values exceeds a predetermined threshold value.
- After onset of an overload event, a prognosticated load curve (for future loads) of the loading unit is assessed from a plurality of measurement values substantially captured from the onset of the overload event.
- (Thereafter) a planned power flow curve for the magnetic field unit is determined by means of which the prognosticated load curve is dampened time-dependent so that a planned load curve results which remains beneath a predetermined load limit. This allows in particular to prevent the occurrence of damage where damage to the objects is feared respectively expected.

The power flow through the magnetic field unit is controlled time-dependent according to the planned power flow curve.

The method according to the invention has many advantages. The method permits suitable controlling of the energy absorber in an overload event wherein all the boundary conditions and initial conditions do not need to be previously known. Thus, a prognosticated load curve (future load curve) is derived from the measurement values captured after the onset of the overload event as it is probable on the basis of the given measurement values. This assessment or prognosis of a future load curve may for example be supported on empirical values. Thus, highly probable conclusions about the future curve of the overload event can be made from the curve of the preceding measurement values during the overload event.

The magnetic field unit is controlled in dependence on the prognosticated load curve so that the load on a transported object is reduced and damage is excluded with a high degree of probability. A risk of damage in a certain range of e.g. 1% or 5% or 10% or even more may be tolerated.

The method absorbs or converts the impulse respectively its energy acting in the overload event to reduce the resulting load on a or the protected object and to avoid damage to the protected object by way of energy absorption or dissipation of energy or conversion of energy by means of the energy absorber in the overload event.

The planned power flow curve is determined by way of the prognosticated load curve. This means that the planned power flow curve can be computed time-dependent or else a time-dependent power flow curve is retrieved from a memory by way of characteristic values. The curves may be selected from those curves stored in a memory.

A "curve" (load curve, power flow curve etc.) always means a time curve and time-dependent curve of the respective quantity.

The method serves to transport objects wherein each object is provided for separate transport at a time. It is also possible to transport multiple or a plurality of objects at a time. At any rate, multiple objects may be transported successively.

The method allows for the load unit respectively the energy absorber of the loading unit to comprise multiple magnetic field units wherein each of the magnetic field units may be provided with one or more electric coils.

In simple cases the prognosticated load curve may be interpreted in the sense of the present invention to be the load curve adjoining the non-dampened side of the assembly. In a correctly prognosticated load curve it would approximately ensue on the non-dampened side of the assembly. The pertaining planned load curve is then interpreted in this sense as the load curve adjoining the dampened side of the assembly. The actual load curve is influenced by the action of the energy absorber.

A prognosticated load curve is understood to mean a passive load curve assessed for the future which is anticipated without control of the magnetic field unit. In the overload event a prognosticated load curve is first determined or estimated. This prognosticated and passive load curve may be determined without control of the power flow. It is also possible to determine the prognosticated load curve without current. This means that there is not only a change of the control of the power flow but a zero-current state of the energy absorber is assumed for the prognosticated load curve. It is also possible to determine the prognosticated load curve without any action of the magnetic field. For example permanent magnets may be provided which supply a specific magnetic field at the magnetic field unit.

In all the cases the energy absorber acts as a device for energy dissipation and in particular for converting kinetic energy to heat. A reduction of energy input is in particular caused. The energy absorber may act as a damper device and in particular as a one-off damper device so as to keep damage from the object in single (extreme) overload cases. The energy absorber is preferably connected both with the receiving unit and with the carrier device. Both the receiving unit and the carrier unit are components of the loading unit. The energy absorber permits relative motion between the receiving unit and the carrier device at least in an overload event. The energy absorber is preferably provided on an assembly which together with the receiving unit and the carrier device forms the load unit.

Damage to an object in the sense of the present application is understood to mean a state in which the object is at least temporarily changed in a way considered to be disadvantageous and undesirable. Such damage may be a temporary damage. Or else such damage may be permanent or even irreparable and resulting in permanent impairment or a total wreck.

Where the transported objects are persons, damage to a person is impairment of the person's health. Permanent damage in a person means at least a long-term and severe impairment of their well-being. Or else it is possible that damage results in a permanent health impairment or even in the death of the person.

The planned power flow curve is preferably determined so that a DRI value in the planned load curve does not exceed a predetermined level.

Damage to an object that is an item or instrument may be temporary so that for example the function of the instrument is compromised or else fails for a specific or indetermined period. Such damage is in particular long-term and may be, or result in, a permanent defect. For example a component on a printed circuit board may break or a microdefect or misalignment of the instrument may occur so that the instrument can only be used again following a complex readjustment which may only be possible in a workshop.

In all the cases damage is expected if the probability for damage exceeds a specific level. Damage must be expected in particular if the probability exceeds e.g. 1%, 5%, 10% or even 25%.

In a preferred specific embodiment a damage is prognosticated if within the prognosticated time period a prognosticated load acting on an object and/or a receiving unit exceeds a predetermined magnitude. The predetermined magnitude of the load may be dependent on the type of the transported object. The load may for example be dependent on whether a person and which person is transported. The predetermined load magnitude is also dependent on whether an animal, an instrument and what kind of instrument is transported. Absent any details or information about the nature of the transported objects, a standardised object may be used as a basis and thus the load acting on the loading unit is used as a basis.

The decision respectively determination of whether damage is prognosticated takes into account in particular the level and/or duration of an acting load. When determining or calculating a load, an acting acceleration and/or acting force is in particular taken into account. Acceleration may be directly captured through an acceleration sensor. It is also possible to use one or more displacement sensors which are read out at fixed or variable time intervals. The captured data allow to compute acceleration values. Or else it is possible to use force sensors or weight sensors which obtain for example the weight of a transported object. Capturing the weight allows to take into account the weight of the object so that for example in the case of a large, heavy man a different damping is used than for a relatively small, lightweight woman.

In all the configurations it is particularly preferred to estimate the prognosticated load curve from a plurality of measurement values which are at least substantially captured from the onset of the overload event. In all the cases it is possible to supplementarily base the prognosis on measurement values preceding the onset of the overload event. Preferably, multiple or a plurality of preceding measurement values is used during the overload event to improve the precision and significance of a prognosis. For example if a pressure sensor is disposed on the floor of a transporter that is an armoured troop carrier and if a mine detonates beneath the troop carrier, then the air pressure at the floor of the transporter will increase very rapidly and dramatically. At a certain point in time when the pressure acting on the vehicle floor is already high, a soldier sitting on a loading unit will not yet feel the effect of the explosion. The steep curve of the pressure increase and the time curve and the absolute level of the already reached air pressure allow to make a feasible prognosis how the explosion will further affect the troop carrier on the whole and a loading unit. In this case the advantage is utilized that the air pressure sensor disposed on the vehicle floor detects the loads of the explosion at an earlier time than will be felt farther above in the vehicle interior. Then however, the overload event has already begun and the measurement values have been measured after the onset of the overload event.

It is also possible to use at least one measurement value or multiple or a plurality of preceding measurement values at the onset or even preceding the onset of the overload event, for example the weight of a person or another object.

In all the cases the planned power flow curve is determined so that the prognosticated load curve is dampened time-dependent so that within the planned load curve a predetermined load limit is not exceeded and in particular there will be no damage. This means that the planned power flow curve effects a damping so that the prognosticated load curve is dampened at all times so that the presumed load lies beneath the permissible limit load (load limit). The planned power flow curve ensues in a planned load curve that is obtained time-dependent by way of the planned power flow curve. Other than influencing the magnetic field unit, the basic damping of the energy absorber is taken into account as well.

For example a permanent magnet may generate a basic field. Moreover the energy absorber is preferably operated with a magnetorheological absorber fluid wherein the absorber fluid passes from a first compartment of an absorber chamber through a valve into a second compartment. Thus, a hydraulic flow resistance is present which contributes to the basic damping of the energy absorber.

Measurements continue during an overload event. The current measurement values are preferably used to obtain the current load and the current power flow is adapted so that the planned load curve is achieved. The current load can be checked for current measurement values with each new measurement value. It is also possible to newly obtain the current load at predetermined or selected time intervals. It is also possible to provide for the time interval between two new captures to be dependent on the last current load to enable higher time resolution in higher loads.

When a current load is obtained that deviates from the planned load curve, then the current power flow is increased or decreased accordingly so as to achieve the planned load curve.

In all the configurations it is possible to obtain respectively detect an overload event if at least one measurement value exceeds a predetermined value. It is also possible and preferred to obtain a characteristic prognosis value from the measurement values and to detect an overload event if the characteristic prognosis value exceeds a predetermined characteristic value. This is the case for example if multiple successive measurement values are evaluated and it is determined from the measurement values that for example a linear or square or exponential increase of the measurement values is given. Then it is highly probable that the measurement values continue to rise at least for a specific time period so that a characteristic prognosis value can be obtained which takes into account the anticipated future development of the measurement values.

This method is particularly advantageous since it is not necessary to first reach high and potentially dangerous measurement values but the likely development of the situation is pre-estimated and corresponding response is possible.

In preferred specific embodiments the magnetic field unit comprises at least one permanent magnet. The permanent magnet generates a magnetic basic field which is modulated by way of the magnetic field of an electric coil of the magnetic field unit. This allows the permanent supply of a specific basic damping requiring no electric power for damping. When higher damping is required, the magnetic field of an electric coil can boost the acting magnetic field. When lower damping is required, the magnetic basic field of the permanent magnet can be attenuated accordingly. The or at least one electric coil is preferably dimensioned so that it is functional only for the duration of an overload event (event) lasting e.g. 100 ms. This allows a thinner, more lightweight and more cost effective configuration of the electric coil, the power supply wiring and other components. This allows a more economic realization of the assembly respectively the actuator. In the case of extended power application the electric coil would be overloaded and might burn out.

As an overload event is detected, measurement values are preferably captured periodically. A current prognosticated load curve for a future load on the loading unit is periodically estimated therefrom. This means that a prognosis can be made not only once at the onset but that new prognoses keep being made even during the process to adapt the process flow to what is the current development. Again, passive prerequisites are assumed for the current prognosticated load curve so that the current damping is then added to what is the currently measured load to obtain a current, passive load that is present in a passive basic state.

The current prognosticated load curve is preferably used to periodically obtain a current planned power flow curve. In this way the current planned power flow curve is adapted to the currently prognosticated load curve.

Accordingly the currently prognosticated load curve is then used to determine whether damage is prognosticated respectively whether damage must be expected to the objects transported on the loading unit. When it is determined that no more damage is anticipated, the process may continue correspondingly. When it is determined that damage is anticipated, corresponding countermeasures are then taken.

Preferably a currently planned load curve is determined and the pertaining current planned power flow curve is derived wherein the prognosticated load curve is dampened time-dependent so that as far as possible there is no more damage within the planned load curve.

In all the configurations measurement values may be captured from 2 or more sensors. For example air pressure sensors may be provided on the floor or in another spot of the transporter. Or else, acceleration sensors may be provided on the floor of the transporter or else at the loading unit or the carrier device or the receiving unit of the loading unit. Sensor may also be provided at the objects. Then it is preferred to utilize data from two or more optionally different sensors.

In advantageous configurations measurement values are obtained via loads on the loading unit, the carrier device, the transporter, the effective acceleration, effective force, or the air pressure. Vertical acceleration values are in particular taken into account.

The energy absorber on the loading unit employed in the process preferably comprises an absorber chamber that is at least partially filled with a magnetorheological fluid and at least one electric coil which forms the entirety or a substantial portion of the magnetic field unit. The power flow through the electric coil controls the absorber unit accordingly.

A loading unit according to the invention comprises a receiving unit for receiving objects intended for transport and a carrier device for connection with a transporter and at least one energy absorber disposed between the loading unit and the carrier device. The energy absorber is provided to dampen loads acting in an overload event.

The energy absorber is in particular suitable and set up to absorb energy in a single overload event involving energy input that is so high that absent an energy absorber, damage to an object provided for transport on the loading unit is highly probable, so as to reduce loads acting on the transported object in the overload event by way of energy absorption by means of the energy absorber.

An absorber force of the energy absorber can be influenced by means of at least one electrically controlled magnetic field unit. A control device is provided wherein at least one sensor device is provided to capture measurement values of a load on the loading unit. The control device is set up and configured to determine an overload event if a measure derived from the measurement values exceeds a predetermined threshold value.

The control device is set up and configured to estimate a prognosticated load curve of the loading unit upon the onset of an overload event, from a multitude of measurement values substantially captured from the onset of the overload event. The control device is set up and configured to determine a planned power flow curve for the magnetic field unit where the prognosticated load curve is dampened time-dependent so that a planned load curve ensues which remains beneath a predetermined limit value. The control device is set up and configured for time-dependent control of the power flow through the magnetic field unit according to the planned power flow curve.

The absorber is adapted for a single load. In an explosion or the like the absorber dissipates or absorbs energy to reduce the load acting on an object.

It is possible to provide the loading unit with a shearing device which shears off as the load acting on the loading unit exceeds a predetermined level. It is possible for the control device to detect an overload event as a shearing sensor of the shearing device detects that the shearing device shears off.

In all the cases it is preferred to specify a permissible limit load for a standard person. Sensor values from a sensor unit attached to a person may likewise be taken into account.

It is possible to integrate a comfort function to dampen weak shocks beneath an overload event.

In all the cases it is possible to estimate the evaluation of a risk of injury to the spine of a person representing the object by deriving the Dynamic Response Index (DRI) which evaluates vertical shocks e.g. in ejector seats based on the acceleration. A formula for computing the DRI according to the NATO standard can be found at Wikipedia (http://en.wikipedia.org/wiki/Dynamic_response_index). Accordingly, given a DRI of 17.7 the probability of severe injury is 10%.

Regulating is also possible by the spine force and in particular the force in the lower lumbar region (lumbar spine) by way of another magnitude corresponding to this force.

Since the spine force cannot be measured directly, conclusions should be made based on other magnitudes. It is for example possible to measure force/pressure/torque on a mine protection seat or the seat frame or a cushion placed on the mine protection seat. Using a sensor mat similar to those showing local resolution of pressure/force is also conceivable.

It is also conceivable to only control the power specification: one can obtain (over an extended period) the passenger weights and corresponding characteristic values can be precalculated. The suitable characteristic curve is then selected e.g. by means of acceleration sensors.

The invention also enables responses to explosions which are more powerful than expected. The process is adapted to the currently prevailing conditions so as to optimally utilize travelled distances.

In all the cases the loading unit is in particular configured as a seat device of a vehicle or motor vehicle. The seat device comprises a receiving unit configured as a seat and a carrier device configured as a seat frame. The energy absorber is disposed between the seat and the seat frame.

In the sense of the present invention a single overload event is preferably considered to be the explosion of a mine. Other single overload events involving energy input in the sense of the present invention may in particular be those where a pulse strength and pulse length cannot be estimated in particular from preceding measurement values. Such a single overload event occurs e.g. in a run-off-road single vehicle accident for example if the driver loses control and the vehicle makes an unanticipated and unpredictable fall down a bank or the like and experiences a hard impact landing in a spot deeper down. In these accidents the strength of the energy input in the overload event cannot be derived from the vehicle speed but it depends on the height of the fall which, however, cannot be derived e.g. from the speed of the vehicle.

Therefore it is possible and preferred with the present invention to protect, or to reduce loads on, the passengers in motor vehicles in so-called run off-road accidents which e.g. in the USA are responsible for ca. 50% of fatal traffic accidents.

Road vehicles such as cars, SUVs, trucks etc. running off paved roads into rough terrain due to distraction, tiredness, and bad weather is particularly frequent. Vehicles showing an assembly according to this invention are preferably equipped with a seat construction with a seat and a seat frame where the previously described energy absorber absorbs the majority of the impact energy which in particular involves vertical or substantially vertical effects. To prevent dangerous spine injuries to passengers, there is therefore provided between the seat and the seat frame, at least one energy absorber to cushion the vertical forces and/or the forces parallel to the seat backrest and/or the forces perpendicular to the seat area. These forces build up in a hard (at least partially vertical) impact of the vehicle off the roadway. In these overload events the impact energy that must be absorbed acts largely or substantially or nearly completely in the vertical direction.

The invention is primarily not provided to absorb energy in head-on collisions. For head-on collisions on flat roads, motor vehicles are provided with crumpling zones or airbags.

The strength of loads acting in the vertical in overload events and road-off accidents or the strength of the vertical loads in mine explosions cannot be derived from parameters preceding the overload event since they cannot be estimated or measured.

In all the cases the energy absorber can be installed in the vertical, the horizontal or else inclined.

In the prior art, a sensor in motor vehicles detects whether the vehicle is getting off the road and activates pertaining safety systems such as seat-belt tensioners. However, this does not allow to derive the seriousness of accidents and optimal load reduction resulting therefrom. What is significant is what happens to the vehicle after it gets off the road, where and how it lands or what kind of ground it makes contact with and what spatial orientation the vehicle has upon impact. The method according to the invention provides responses to this relevant impact/impulse as it has been and will be described above respectively below, which results in substantial optimizing and reduction of injuries over the prior art.

In all the specific embodiments, configurations and exemplary embodiments the object transported on a loading unit can be indirectly or directly attached to and/or coupled with and/or disposed on, the loading unit. The connection may be fixed and/or detachable. Or the object is positioned on the loading unit and held in place by way of the weight force and/or lateral boundaries.

Further advantages and properties of the present invention can be taken from the description of the exemplary embodiments which will be discussed below with reference to the enclosed figures.

BRIEF DESCRIPTION OF THE SEVERAL VIEWS OF THE DRAWING

The figures show in.

DESCRIPTION OF THE INVENTION

Figure 1:
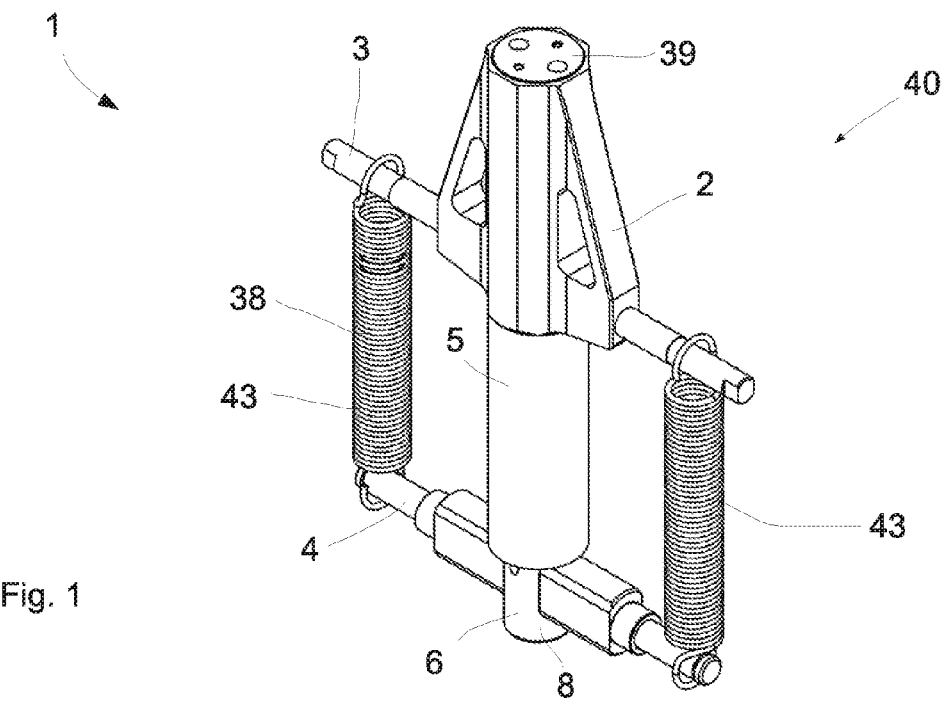
FIG. 1 a schematic perspective view of an inventive assembly.

FIG. 1 shows a schematic perspective view of an inventive assembly 1. The assembly comprises an absorber cylinder provided at one of its ends with a fastener 3 and at the other of its ends, with a holding device 4. The holding device 4 and the fastener 3 each comprise two laterally protruding arms where one biasing spring 43 each of a biasing device 38 is disposed for transferring the assembly 1 back to the idle state 40 following an incident 63, which is also shown in FIG. 1.

The assembly 1 serves for energy absorption or damping of relative motions between the fastener 3 and the holding device 4. The holding device 4 is connected with the piston device 6 of the energy absorber 2 while the fastener 3 is fixedly connected with the absorber cylinder 5. At the upper end one can see an end cover 39 which closes off and defines the second chamber, which is presently hidden in the interior, of the absorber chamber 9.

Figure 2:
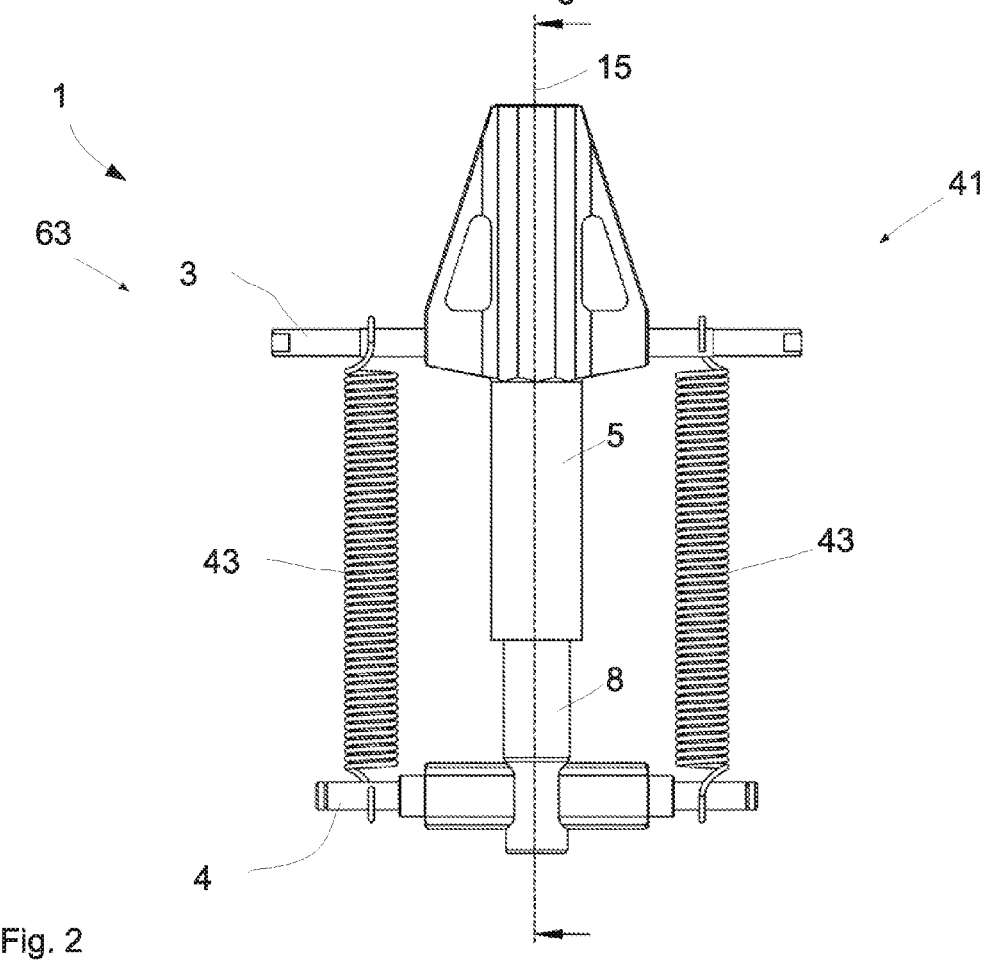
FIG. 2 a front view of the assembly of FIG. 1.

FIG. 2 shows a front view of the assembly 1. An axis of symmetry 15, through which the section according to FIG. 3 runs, extends in the centre through the absorber cylinder 5.

Figure 3:
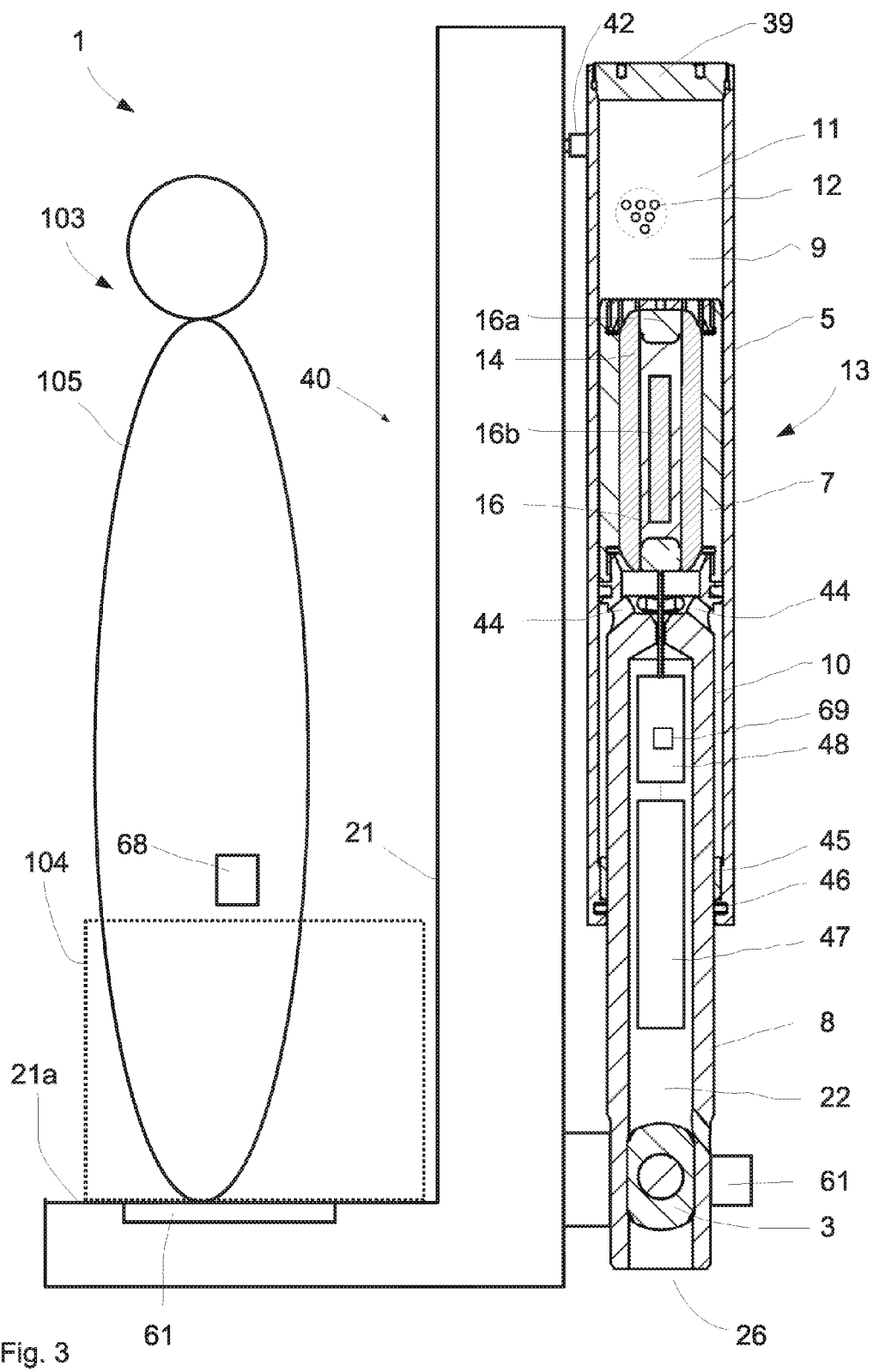
FIG. 3 a sectional side view of the assembly according to FIG. 1 in the damping state.

FIG. 3 shows the section according to FIG. 2 in a damping state 41. Also shown is a seat device 21 with a seat area 21a on which a person such as a soldier can sit in a troop carrier.

In the interior of the absorber cylinder 5 one can recognize a section of the absorber piston 7 connected with the piston rod 8 of the piston device 6. The absorber piston 7 subdivides the absorber chamber 9 in the interior of the absorber cylinder 5 into a first chamber 10 and a second chamber 11. The second chamber 11 is outwardly defined by the end cover 39 and in this case, sealed airtight.

In the idle state the first chamber 10 is at least partially and in particular completely filled with absorber fluid 12. As an incident 63 occurs, the piston rod 8 is pulled out of the absorber cylinder 5 so that the absorber fluid 12 in the first chamber 10 passes through the absorber duct 14 in the absorber piston 7 and into the second chamber 11. In the idle state the second chamber 11 may already be partially filled with the absorber fluid 12. Or else, the second chamber 11 when in the idle state may be hardly or not at all filled with absorber fluid 12 but only with air or another compressible gas or medium.

It can be clearly seen that the piston rod 8 has a very large diameter so that only a comparatively narrow annular gap around the piston rod remains for the first chamber 10. Due to this, the extending absorber piston 7 only displaces a comparatively small volume of absorber fluid 12 out of the first chamber 10. Therefore the flow rates of the absorber fluid 12 in the absorber duct 14 remain low even in the case of incidents 63 caused by explosions so that the length of the absorber piston 7 is sufficient to influence the flow as desired by way of the magnetic field of the electric coil acting as a field generating device 16.

When the flow fluid 12 is made to pass from the first chamber 10 into the second chamber 11, the absorber fluid 12 is transferred inwardly through the radial flow apertures 44 which extend radially obliquely from the outside to the interior. This means that the flow duct or the absorber duct 14 is disposed radially further inwardly than the first chamber 10. This enables efficient use of the interior of the absorber piston 7 to generate the required magnetic field, and for the absorber duct 14.

In this case the piston rod 8 is designed considerably thicker than stability requires. Therefore the piston rod 8 is provided with a hollow space 22 which is configured as a blind hole. The blind hole 22 extends from the end 26 opposite the piston into the piston rod 8. The hollow space 22 may extend up to just in front of the absorber piston 7 so that the length of the hollow space 22 extends over three quarters or more of the length of the piston rod 8 up to the absorber piston 7. The hollow space 22 can be employed accordingly. The control device 48 and an energy storage device 47 are disposed in the interior of this hollow space 22. The control device 48 is connected with the electric coil 16 for controlling the same. Furthermore the control device 48 is connected with a sensor device 61 to absorb and handle the loads on the seat device 21. Other than the sensor device 61, more sensor units 68 may be provided.

The energy storage device 47 ensures that even in case of power failure on board the transporter the assembly 1 will at all times provide sufficient energy for controlling the energy absorber 2. The energy storage device may be a capacitor or an accumulator.

In this case the absorber piston 7 does not only separate the first chamber 10 from the second chamber 11 but it also forms a flow valve 13 which can be controlled by the control device 48.

Figure 4:
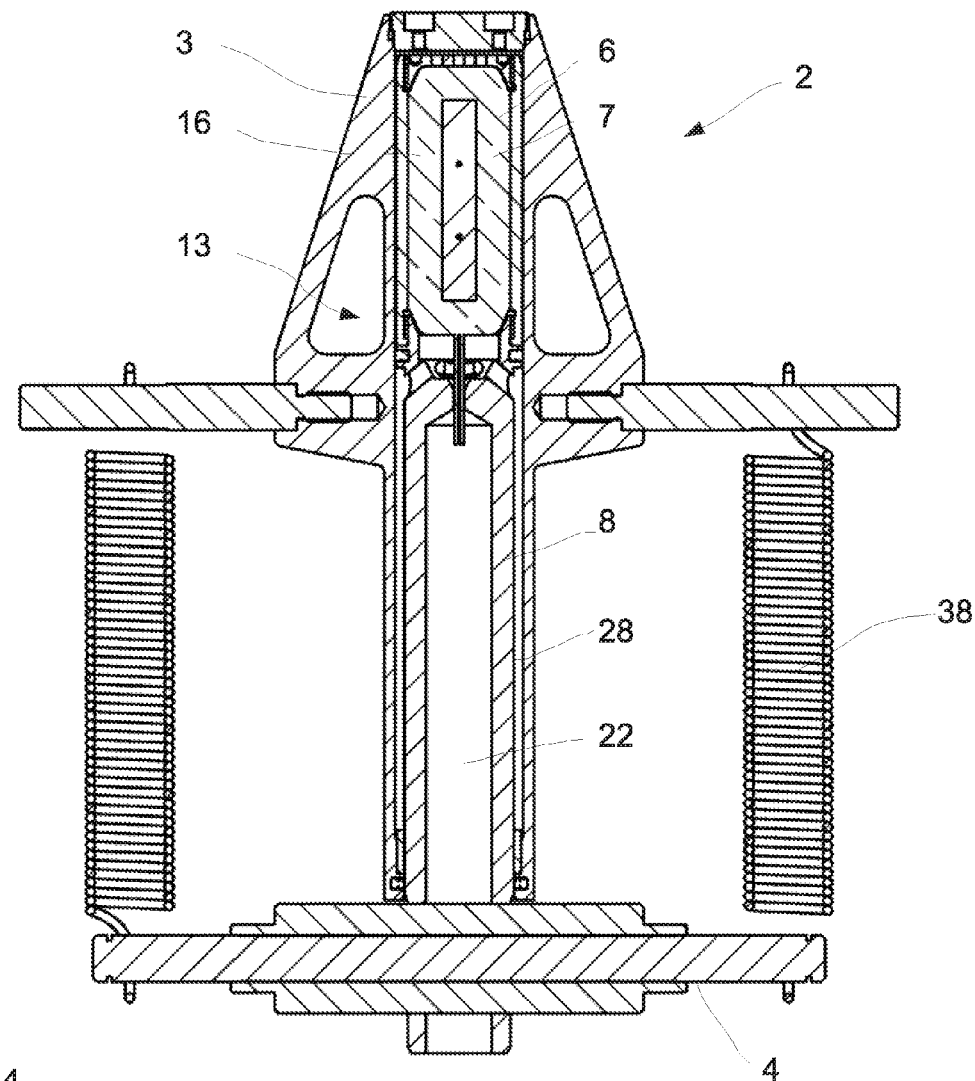
FIG. 4 a sectional front view of the assembly according to FIG. 1 in the idle state.

FIG. 4 illustrates another cross-section of the assembly 1 with the biasing device 38 again shown in section as a resetting device 43. For the sake of clarity, the energy storage device 47 and the control device 48 in the hollow space 22 are not shown. The first chamber 10 forms an annular chamber 28 around the piston rod 8. A radial extension of the annular chamber 28 is less than a wall thickness of the hollow piston rod 8.

Figure 5:
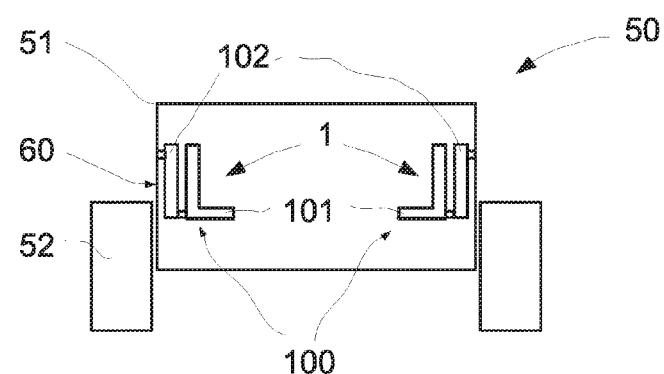
FIG. 5 a vehicle with inventive assemblies to protect passengers in explosions.

FIG. 5 shows a schematic illustration of a transporter 50 such as a troop carrier which is provided with the assemblies 1 according to the invention to protect the passengers in the case of explosions. The transporter 50 has a body 51 to which the mine protection seats 60 representing the assemblies 1 are attached. The vehicle 50 can travel by means of wheels with tires 52. In an incident 63 such as an explosion the vehicle 50 is thrown up in the air wherein the seat devices 21 of the assemblies 1 are subjected to dampened movement so as to prevent permanent impairment to the persons seated thereon.

Figure 6:
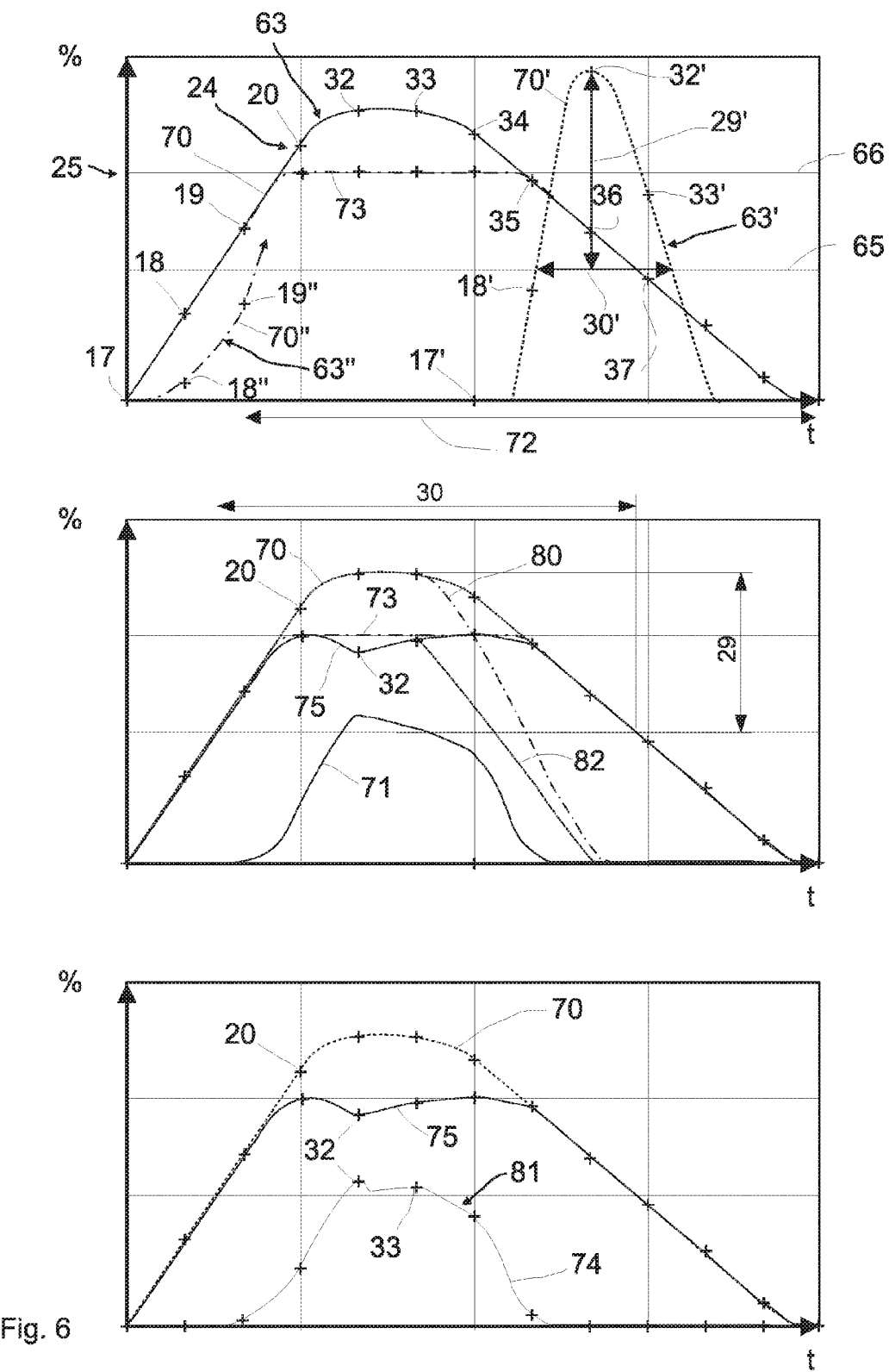
FIG. 6 time curves of a load and the power curves in an overload event.

FIG. 6 shows three simplistic, schematic diagrams of an overload event 63, the first diagram on top illustrating a prognosticated load curve 70 over time. An additional independent, second prognosticated load curve of another overload event 63' is shown in dash-dotted lines and the onset of a third overload event 63" is illustrated.

The centre diagram in FIG. 6 shows once again the prognosticated load curve 70 (this is an approximate prognosis for the load curve on the non-dampened side of the assembly 1) and the pertaining planned load curve 73 (this is approximately the load curve on the dampened side of the assembly 1) and the pertaining planned power flow curve 71.

The bottom diagram in FIG. 6 shows on the same time scale the prognosticated load curve 70 and the actual load curve 75 and the actual power flow curve 74 over time.

The schematically illustrated overload cases 63, 63' and 63" show measurement values 17 through 20 etc. which are for example periodically captured at short time intervals of one millisecond, 10 milliseconds or other useful time intervals.

At the time 0 a first measurement value 17 is captured where the load on the loading unit 100 equals 0. The next measurement value 18 shows a considerably increased load with the measurement value 18 still remaining beneath the threshold value 65 from which an overload event 63 is detected. The third measurement value 19 lies above the threshold value 65 so that an overload event 63 is concluded. Thereafter a prognosticated load curve 70 is computed which is presently determined by way of the measurement values 17, 18 and 19. The measurement values thus far may be extrapolated by way of a linear forward projection. At any rate the measurement values captured after detection of the overload event 63 are included.

Or else it is possible to search a memory device 69 for known curves for these overload cases and to assume a suitable load curve for the prognosticated load curve 70.

As this step is concluded, a prognosticated load curve 70 is established as it is plotted in the top diagram in FIG. 6. As can be directly seen, the prognosticated load curve 70 exceeds both the predetermined characteristic value 25 and the load limit 66, which are presently identical, for objects 103 transported on the receiving unit 101 of the loading unit 100. This prognosticated time period 72 extends from the point in time to the measurement value 19 until the end (about 10 unit times later).

The loading unit 100 in particular serves as a mine protection seat including a seat device 21 whose seat area 21a transports a passenger 105 or a person seated thereon. Thus, the loading unit 100 is suited to be used in troop carriers, helicopters, or other vehicles.

Since the prognosticated load curve 70 exceeds the load limit 66 from which damage to a transported object 103 must be expected or feared, the control device 48 takes countermeasures to obtain the planned load curve 73. Thus, the movement of the receiving unit 101 is dampened accordingly. To obtain the desired result and thus the planned load curve 73, the energy absorber 2 is dampened accordingly. To this end a power flow is applied on the magnetic field unit 16 and in particular the electric coil 16a so as to obtain the planned load curve 73 which does not exceed the load limit 66.

It is possible to not determine or compute a prognosticated load curve 70 until for example a shearing device 42 respectively the shearing bolt of a shearing device 42 shears off which is then considered as a start signal for the controlling processes. Or else it is possible to constantly capture measurement values 17 to 20 etc. and to constantly compute prognosticated load curves to be prepared for an overload event 63 at all times.

It is also possible and preferred to obtain characteristic prognosis values 24 constantly or under certain conditions where a characteristic prognosis value 24 is determined for the next measurement value 20 for example from the last two or three or more measurement values 17, 18 and 19. If the characteristic prognosis value 24 exceeds a predetermined level 65 or 66, this the outset of the overload event 63 and a corresponding prognosticated load curve 70 is determined.

When obtaining the load curve and the danger level of such a load, one will in particular take into account not only the level of an effective force or effective acceleration, but other than the level 29 of a load, the length 30 of a load is also taken into account. It has been found that short-term high loads can be handled better than somewhat lower loads of a longer duration, at least if the loads rise to a certain level while remaining beneath specific threshold values.

In all the cases it is particularly preferred to employ the impulse acting on an object 103 as a basis of the effective load. Other than this, further measurement values may be taken into account.

The prognosticated load curves 70, 70' and 70" illustrated in the top diagram in FIG. 6 show differences in the level of the load concerned and also in the length 30 of the load concerned. Thus the overload event 63' shows a considerably shorter length 30' along with a higher amplitude 29' than do the corresponding values in the overload event 63.

The centre diagram in FIG. 6 shows, other than the load curve 70 first prognosticated as the overload event 63 was detected, also the planned load curve 73 which does not exceed the load limit 66. Furthermore the actual load curve 75 is plotted in a solid line as it ensues from regulating in operation. Finally the centre diagram in FIG. 6 illustrates the planned power flow curve 71 which ensues when the prognosticated load curve 70 is dampened so as to result in the planned load curve 73. At the onset, no power is emitted. After detecting the overload event 63 the power flow is increased so that the planned load curve 73 will remain beneath the load limit 66.

In operation it may happen that the actual load curve 75 deviates from the planned load curve 73. This is shown by the measured point 32 which is noticeably beneath the planned load value. Regulation will now countercontrol and emit to the magnetic field unit 16 a power flow deviating from the planned power flow curve 71 so that the planned load curve 73 is approximated or obtained once again.

During the overload event 63 it may happen that the actual load curve 75 deviates from the prognosticated load curve 70. In particular it is also possible for the originally prognosticated load curve 70 to deviate more or less from reality. Now the method preferably provides for checking even while executing the process steps whether the most recent measurement values (e.g. 32, 33 or 34 to 37) result in a changed prognosis for the load curve. Accordingly a new and currently prognosticated load curve 80 can be obtained which deviates more or less from the originally prognosticated load curve 70. Accordingly the currently planned load curve 82 is adapted which in turn may again clearly differ from the originally planned load curve 73.

The bottom diagram in FIG. 6 illustrates other than the originally prognosticated load curve 70, also the actual load curve 75. Furthermore the actually planned respectively actually realized power flow curve 81 is plotted. Since at the time of the measurement value 32 the actual load is lower than the planned load, the actual power flow 74 is subsequently reduced so that the actual load curve 75 will once again approximate the planned load curve 73. As a comparison of the curve paths of the originally planned power flow curve 71 against the actual power flow curve 81 will show, deviations from the curve path may show at different times. Now, regulation will keep aiming for the planned load curve 73 or 81. Then the planned load curve can be updated from time to time or on a regular basis.

In all the specific embodiments and configurations in the present application the terms "prognosticated load curve", "planned load curve", "planned power flow curve", "planned load curve", "actual load curve", "currently prognosticated load curve", "currently planned power flow curve" and "currently planned load curve" are defined, fixed terms each of which define curve paths and are distinguished from one another. Likewise the terms "prognosticated time" and "current power flow" are unambiguous definitions of terms.

LIST OF REFERENCE NUMERALS

| | |
|---|---|
| 1 | assembly |
| 2 | energy absorber |
| 3 | fastener |
| 4 | holding device |
| 5 | absorber cylinder |
| 6 | piston device |
| 7 | absorber piston |
| 8 | piston rod |
| 9 | absorber chamber |
| 10 | first chamber |
| 11 | second chamber |
| 12 | absorber fluid |
| 13 | absorber valve |
| 14 | absorber duct |
| 15 | axis of symmetry |
| 16 | magnetic field unit |
| 16a | electric coil |
| 16b | permanent magnet |
| 17-20 | measurement value |
| 21 | seat device |
| 21a | seat area |
| 22 | hollow space (in 8) |
| 24 | characteristic prognosis value |
| 25 | predetermined characteristic value |
| 26 | end |
| 28 | annular chamber |
| 29 | level |
| 30 | length |
| 32-37 | measurement value |
| 38 | biasing device |
| 39 | end cover |
| 40 | idle state |
| 41 | damping state |
| 42 | shearing device |
| 43 | biasing spring |
| 44 | radial flow aperture |
| 46 | seal |
| 47 | energy storage device |
| 48 | control device |
| 50 | transporter |
| 51 | (vehicle) body |
| 52 | tire |
| 60 | mine protection seat |
| 61 | sensor device |
| 62 | measurement value |
| 63 | overload case |
| 65 | threshold value |
| 66 | load limit |
| 68 | sensor unit |
| 69 | storage device |
| 70 | prognosticated load curve |
| 71 | planned power flow curve |
| 72 | prognosticated time period |
| 73 | planned load curve |
| 74 | current power flow |
| 75 | actual load curve |
| 80 | currently prognosticated load curve |
| 81 | currently planned power flow curve |
| 82 | currently planned load curve |
| 100 | loading unit |
| 101 | receiving unit |
| 102 | carrier device |
| 103 | object |
| 104 | instrument |
| 105 | passenger |

The invention claimed is:

1. A method of controlling an energy absorber at a loading unit to reduce loads acting on an object transported on the loading unit, the method comprising:
   providing an energy absorber configured to absorb energy in a single overload event involving energy input that is so great that, absent an energy absorber, damage to an object to be protected while being transported on the loading unit is highly probable, so as to reduce loads on the object resulting from the overload event by way of energy absorption by the energy absorber;
   disposing the energy absorber to act between a receiving unit for receiving the object to be transported and a carrier device for connection with a transport device; and providing an electrically controllable magnetic field unit disposed to influence an absorber force of the energy absorber by performing steps as follows:

capturing measurement values of loads acting on the loading unit sequentially by a sensor device;

when a measure derived from the measurement values exceeds a predetermined threshold value, determining that the overload event is occurring;

following an onset of the overload event, assessing a prognosticated load curve of the loading unit from a plurality of measurement values substantially captured from the onset of the overload event;

determining a planned power flow curve for the magnetic field unit by way of which the prognosticated load curve is damped in time dependence so that a planned load curve results which remains beneath a predetermined load limit; and controlling a power flow through the magnetic field unit in time dependence according to the planned power flow curve.

2. The method according to claim 1, wherein the planned power flow curve is determined so that a dynamic response index value in the planned load curve does not exceed a predetermined level.

3. The method according to claim 1, which comprises taking into account a weight of the object.

4. The method according to claim 1, wherein the planned power flow curve is determined so that the prognosticated load curve is damped time-dependent so that the planned load curve does not exceed the load limit.

5. The method according to claim 1, which comprises using current measurement values to determine a current load and adapting a current power flow to thereby achieve the planned load curve.

6. The method according to claim 1, wherein an overload event is determined if at least one measurement value exceeds a predetermined threshold value.

7. The method according to claim 1, which comprises obtaining a characteristic prognosis value from the measurement values, and detecting an overload event if the characteristic prognosis value exceeds a predetermined characteristic value.

8. The method according to claim 1, which comprises, after detecting an overload event, periodically capturing measurement values from which a current prognosticated load curve is assessed for a future load on the loading unit.

9. The method according to claim 8, which comprises periodically determining a current, planned power flow curve by way of the current prognosticated load curve.

10. The method according to claim 9, which comprises determining whether damage is prognosticated by way of the current prognosticated load curve in which damage to the object being transported on the loading unit must be expected.

11. The method according to claim 1, which comprises periodically determining the currently planned power flow curve so that the currently prognosticated load curve is dampened in time dependency so as to obtain or approximate the currently planned load curve.

12. The method according to claim 1, which comprises acquiring the measurement values by a plurality of two or more sensors.

13. The method according to claim 1, which comprises obtaining measurement values about a parameter selected from the group consisting of a load on the loading unit, the carrier device, the transport device, an acceleration, and an air pressure.

14. The method according to claim 1, wherein a control device detects an overload event when a shearing sensor detects that a shearing device is shearing off.

15. The method according to claim 1, which comprises specifying a permissible limit load for a standard person.

16. The method according to claim 1, which comprises taking into account sensor values from a sensor unit disposed on a person.

17. The method according to claim 1, wherein the loading unit is coupled with a sensor with which a weight of a transported person or an acceleration of the loading unit can be obtained.

18. The method according to claim 1, wherein the energy absorber is provided with an absorber valve and the method comprises controlling a damping of the absorber valve by way of a strength of an applied magnetic field.

19. A loading unit, comprising:

a receiving unit for receiving objects to be transported and a carrier device for connection with a transportation device and an energy absorber disposed between a loading unit and said carrier device;

an energy absorber for damping loads acting in an overload event, said energy absorber being configured to absorb energy in a single overload event involving energy input that is so high that, absent said energy absorber, damage to the object being transported on the loading unit is highly probable, so as to reduce resulting loads acting on the transported object in the overload event by way of energy absorption by way of said energy absorber;

an electrically controlled magnetic field unit for influencing an absorber force of said energy absorber;

a control device and a sensor device for acquiring measurement values for loads on the loading unit, said control device being configured to determine an overload event when a measure derived from the measurement values exceeds a predetermined threshold value;

wherein said control device is configured to assess after an onset of the overload event from a plurality of measurement values obtained substantially after the onset of the overload event, a prognosticated load curve on the loading unit, and said control device is configured to obtain a planned power flow curve for said magnetic field unit where the prognosticated load curve is damped in time dependence so that a planned load curve ensues which remains beneath a predetermined threshold value; and wherein said control device is configured to control a power flow through said magnetic field unit in time dependence according to the planned power flow curve.

* * * * *